US006302632B1

(12) United States Patent
Lin

(10) Patent No.: US 6,302,632 B1
(45) Date of Patent: Oct. 16, 2001

(54) SCREW WITH COMPOUND RECESSES

(76) Inventor: Chao-Wei Lin, No. 15 Hsin Kuang Village, Kuan Miao Town, Tainan County (TW)

( * ) Notice: Subject to any disclaimer, the term of this patent is extended or adjusted under 35 U.S.C. 154(b) by 0 days.

(21) Appl. No.: 09/579,979

(22) Filed: May 26, 2000

Related U.S. Application Data

(63) Continuation-in-part of application No. 09/193,489, filed on Nov. 17, 1998, now abandoned.

(51) Int. Cl.[7] ............................ F16B 23/00; F16B 35/06

(52) U.S. Cl. ............................ 411/404; 411/410; 411/919

(58) Field of Search .................................... 411/403, 404, 411/410, 919, 402

(56) References Cited

U.S. PATENT DOCUMENTS 2,445,978 * 7/1948 Stellin .................................. 411/404
3,575,080 * 4/1971 Hannay ................................ 411/404
5,020,954 * 6/1991 Dreger ............................. 411/404 X

* cited by examiner

*Primary Examiner*—Neill Wilson
(74) *Attorney, Agent, or Firm*—Bacon & Thomas, PLLC

(57) ABSTRACT

Screws with compound threads. Each of the screws includes a head with a compound drive recess therein. The compound drive recess for the screw driver(or the screw drive bit) is shaped to have four symmetrical fan-shaped portions, a center square portion with four faces, and eight chamfer edges intermediate to the center square portion and each of the four fan-shaped portions. The compound drive recess allows the screw to be driven by various screw driver such as slot, Phillips, square, Pozi and cross-square. The compound drive recess can be driven by its tailor-made driver, which gives the compound drive recess the capacity to withstand high driving torques with minimal drive bit slip or cam-out.

2 Claims, 6 Drawing Sheets

SCREW WITH COMPOUND RECESSES

This Appl is a C-I-P of Ser. No. 09/193,489 filed Nov. 17, 1998 abandoned.

BACKGROUND OF THE INVENTION

1. Field of the Invention

The present invention relates generally to a drive recess formed in the head top surface of a screw, and more particular to a novel compound drive recess permitting the screw to drive various types of drive bits, such as Slot, Phillips (cross), Square, Pozi, and Cross-square. In addition, this invention also can be driven by its tailor-made drive bit (U.S. patent Ser. No. 09/373,022) which gives the compound drive recess the capacity to withstand high driving torques with minimal drive bit slip or cam-out. This invention also relates to screws with compound recesses of U.S. Ser. No. 09/193,489 which has been abandoned.

2. Description of the Related Art

Currently, conventional screws or bolts include a variety of head types, such as countersunk, oval, pan, truss, etc., which can adapt to at least five kinds of drive recesses as shown in FIG. 1, 2, 3, 4 and 5. Element A in FIG. 1 is a slot; element B in FIG. 2 is a cross; element C in FIG. 3 is a cross-square combination; element D in FIG. 4 is a square; and element E in FIG. 5 is a Pozi. Drive recess structures like those mentioned above cannot stand comparatively large torques due to their structural weakness and uneven pressure distribution. The loose fit between the drive recess and the drive bit, which are very common in the above mentioned drive recesses, may produce a large torque causing impaired drive recess or broken drive bit.

U.S. Pat. No. 3,575,080 titled "FASTER WRENCHING MEANS" includes recess composed of inner portions of the pockets (13, 14 and 15); web surface (19, 20 and 21), and a central portion (22). This type of recesses limits the range of available drive bits such as slot drive bits (FIG. 6), cross-square drive bits (FIG. 10), and Phillips drive bits (FIG. 12), and Pozi drive bit (FIG. 14).

Next, U.S. Pat. No. 3,108,623 and 4,187,892 cannot be driven by a drive bit with a fan-shaped tip.

SUMMARY OF THE INVENTION

The drive recesses of the present invention possess the following two features:

A) withstand comparatively large driving torques with high retention of the drive bit; and B) enable the drive recesses to be driven by various types of drive bits.

This compound drive recess is formed in the top surface of a screw head, which consists of four symmetrical fan-shaped portions, a center square portion and eight chamfer edges intermediate the center square portion and each of the fan-shaped portions. Another version of this compound drive recess consists of all the structures except the eight chamfer edges.

Further objects, features and advantages of the present invention will become apparent from the following detailed description of the invention taken in conjunction with the accompanying drawing wherein like reference numerals designate like elements throughout the several views.

DETAILED DESCRIPTION OF THE PREFERRED EMBODIMENTS

Figure 18:
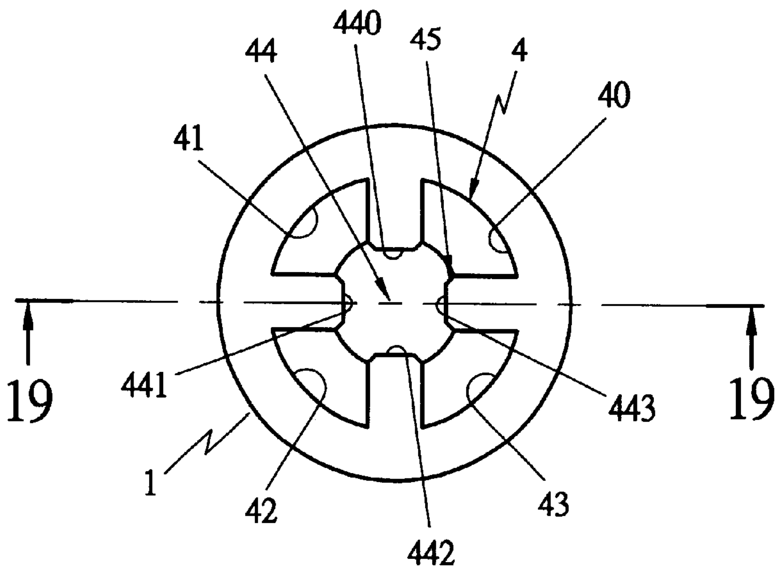
FIG. 18 is a top view of the compound drive recess in the present invention.
Figure 19:
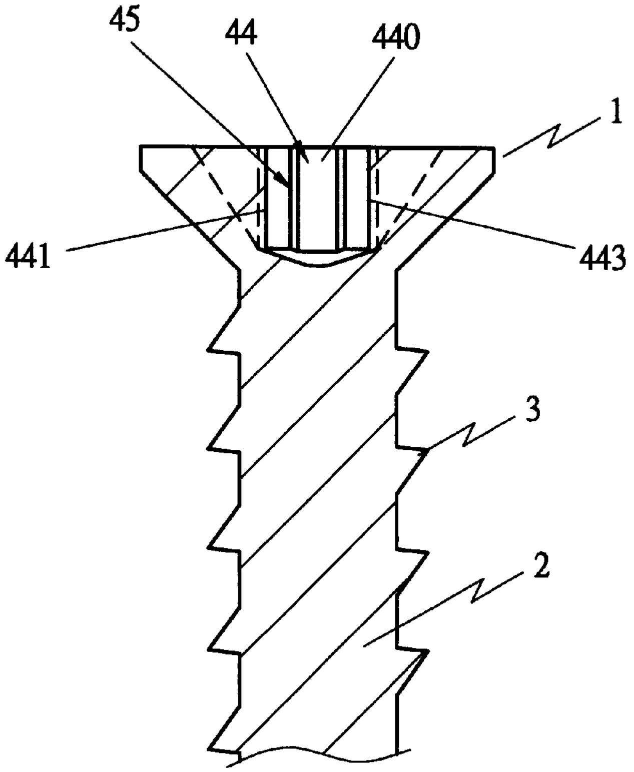
FIG. 19 is a cross-sectional view of line 19—19 in FIG. 19.
Figure 20:
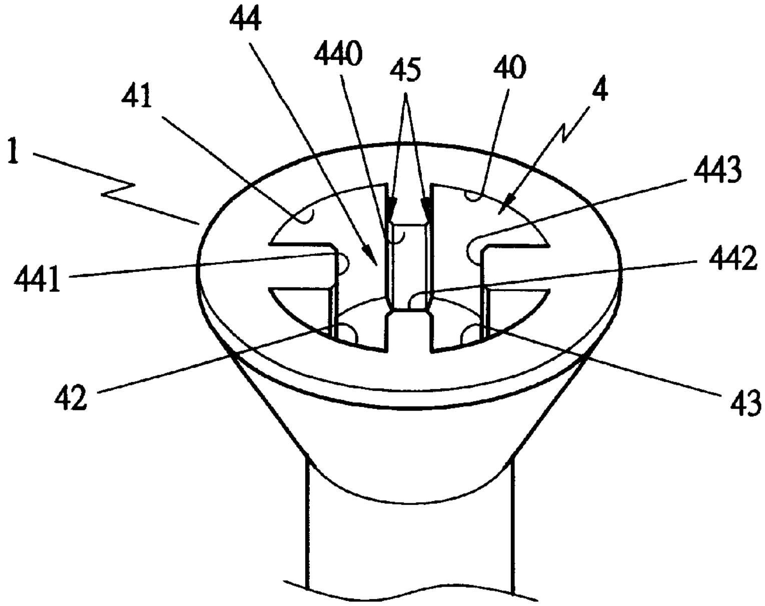
FIG. 20 is a perspective view of the compound drive recess in the present invention.

Referring now to the drawing, a compound drive recess constructed in accordance with the present invention is indicated generally at FIG. 18 and 19.

Figure 21:
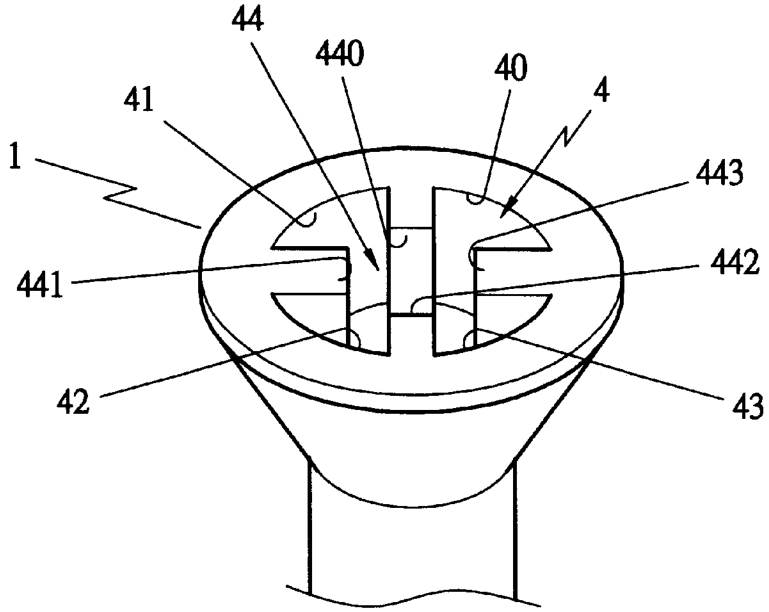
FIG. 21 is a perspective view of the no-chamfer-edges compound drive recess in the present invention.

The compound drive recess 4 is indented in the head 1 formed at one end of the shank 2 which includes a male-thread 3. The recess 4 consists of four symmetrical fan-shaped portions 40, 41, 42, 43, a center square portion 44 with four faces or vertical walls 440, 441, 442, 443, and eight chamfer edges 45 intermediate the center square portion 44 and each of the four fan-shaped portions 40, 41, 42, 43. Another modified version which has no chamfer edges 45 is shown in FIG. 21.

Figure 1:
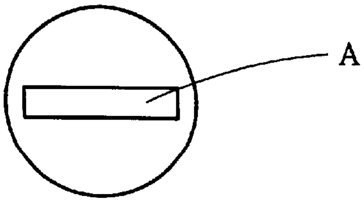
FIG 1 (PRIOR ART)
FIG. 1 is a top view of a conventional slot drive recess.
Figure 2:
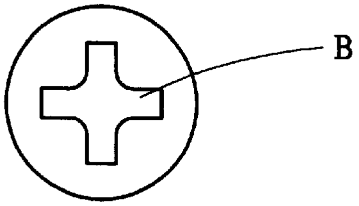
FIG 2 (PRIOR ART)
FIG. 2 is a top view of a conventional Phillips (cross) drive recess.
Figure 3:
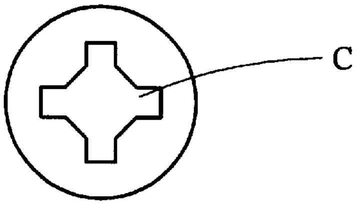
FIG 3 (PRIOR ART)
FIG. 3 is a top view of a conventional cross-square drive recess.
Figure 4:
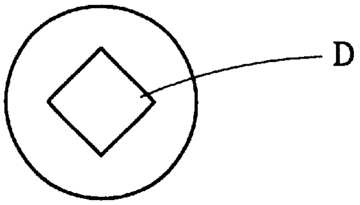
FIG 4 (PRIOR ART)
FIG. 4 is a top view of a conventional square drive recess.
Figure 5:
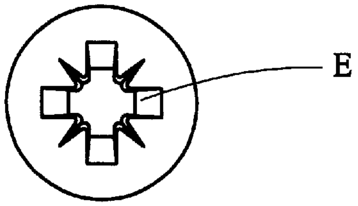
FIG 5 (PRIOR ART)
FIG. 5 is a top view of a conventional Pozi drive recess.
Figure 8:
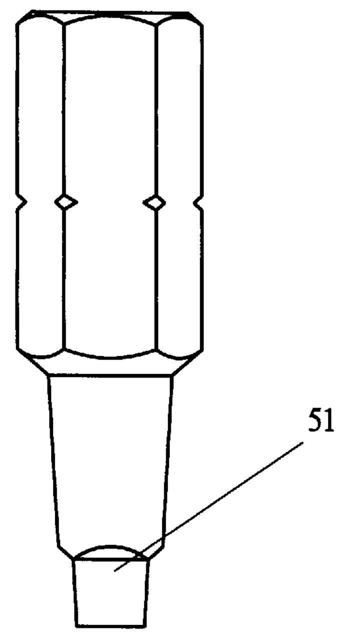
FIG. 8 is a side view of a square drive bit.
Figure 6:
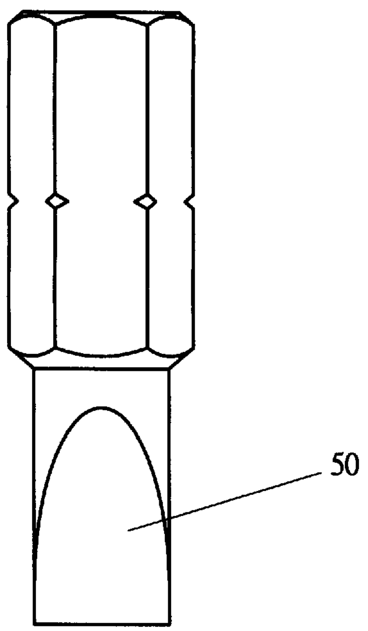
FIG. 6 is a side view of a slot drive bit.
Figure 9:
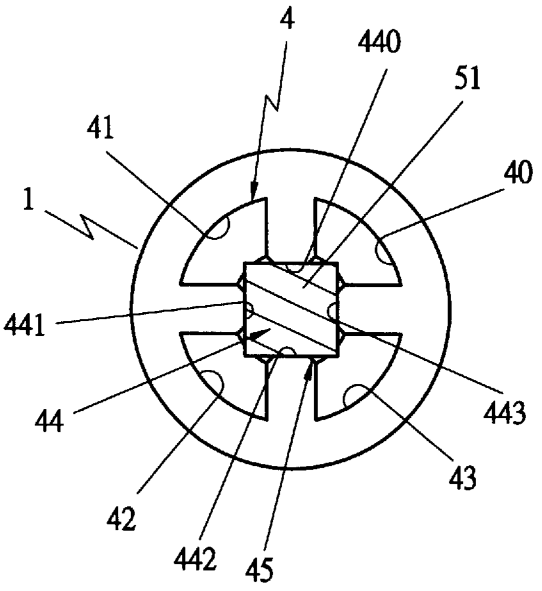
FIG. 9 is a cross-sectional view of a square drive bit engaged in the present invent he compound drive recess)
Figure 7:
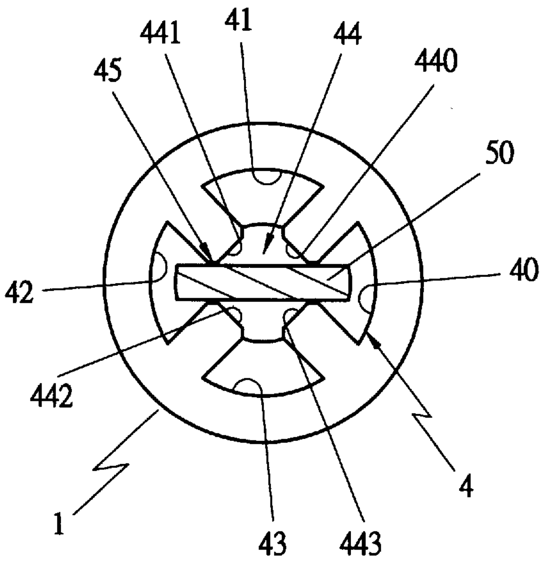
FIG. 7 is a cross-sectional view of a slot drive bit engaged in the present invention (the compound drive recess)
Figure 12:
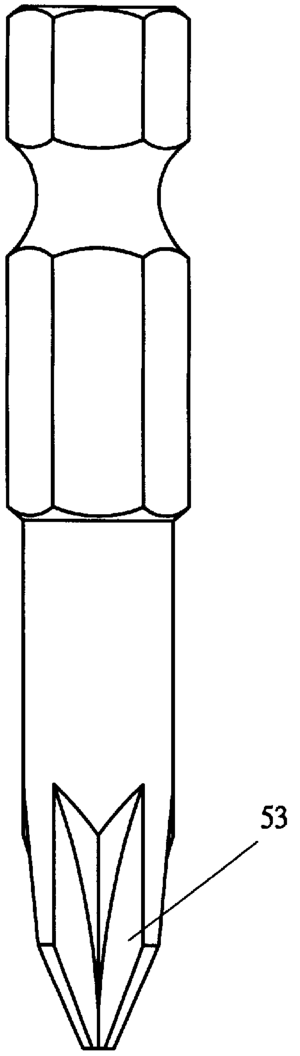
FIG. 12 is a side view of a Pozi drive bit.
Figure 10:
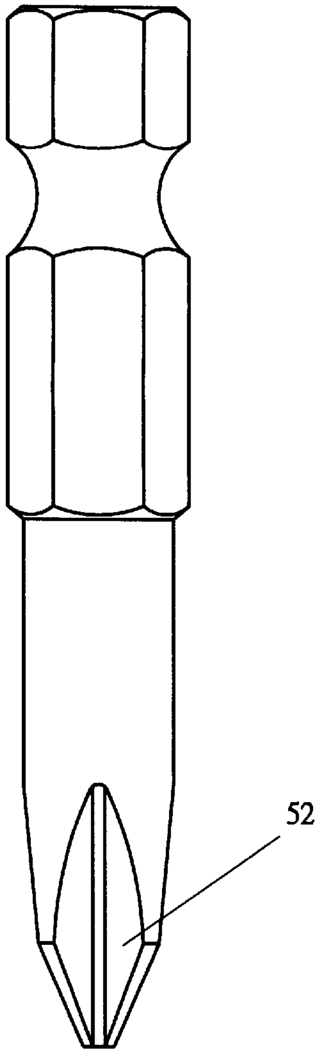
FIG. 10 is a side view of a Phillips (cross) drive bit.
Figure 13:
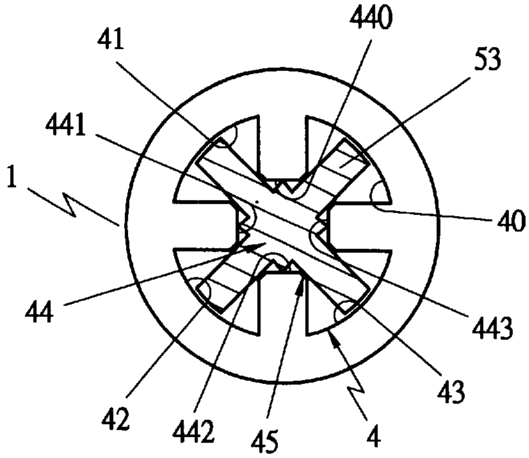
FIG. 13 is a cross-sectional view of a Pozi drive bit engaged in the present invention (the compound drive recess)
Figure 11:
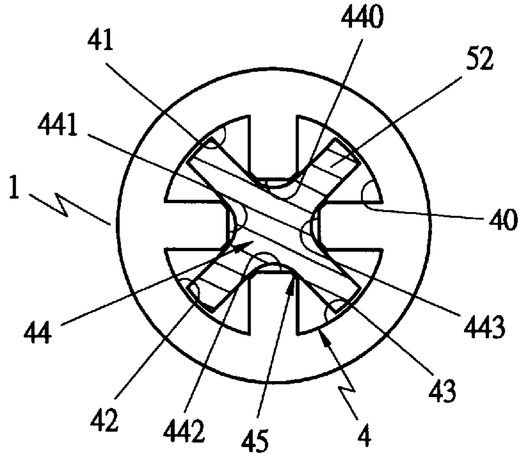
FIG. 11 is a cross-sectional view of a Phillips (cross) drive bit engaged in the present invention (the compound drive recess)
Figure 15:
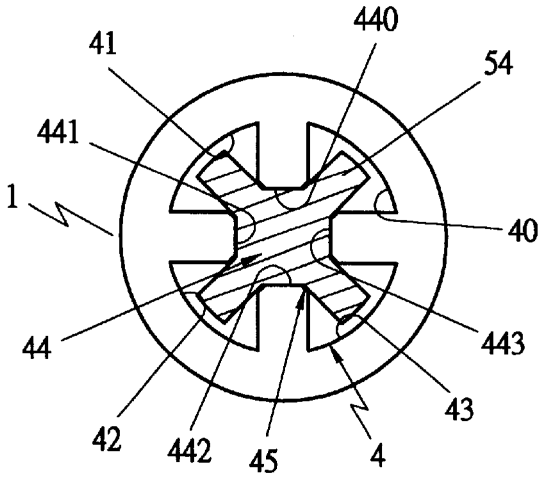
FIG. 15 is a cross-sectional view of a cross-square drive bit engaged in the present invention (the compound drive recess)

Conventional drive bits shown in FIGS. 6, 8, 10,12 and 14 includes a slot drive bit 50, square drive bit 51, Phillips (cross) drive bit 52, Pozi drive bit 53, are single-purposed. They can only be used properly in its own drive recess type. However, the present invention (the compound drive recess) can adapt all the drive bits as shown in FIG. 7, 9, 11, 13 and 15. The present invention fit with a slot drive is shown in FIG. 7, with a square drive in FIG. 9, with a Phillips (cross)

drive in FIG. 11, with a Pozi drive in FIG. 13, and with a cross-square drive in FIG. 15.

Figure 16:
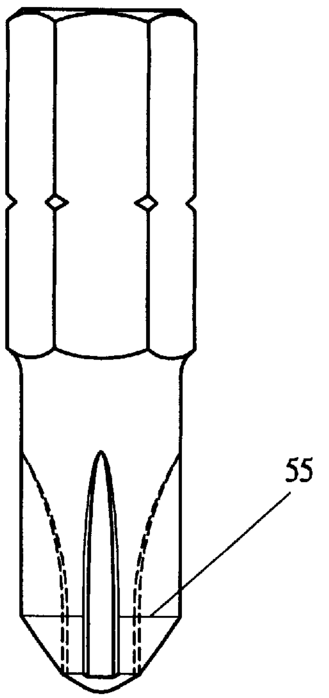
FIG. 16 is a side view of a tailor-made drive bit for this compound drive recess.
Figure 14:
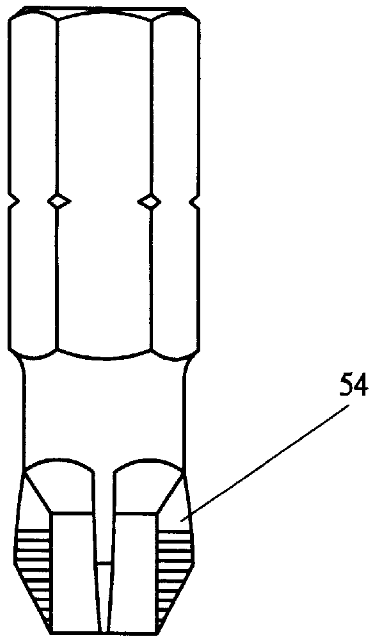
FIG. 14 is a side view of a cross-square drive bit.
Figure 17:
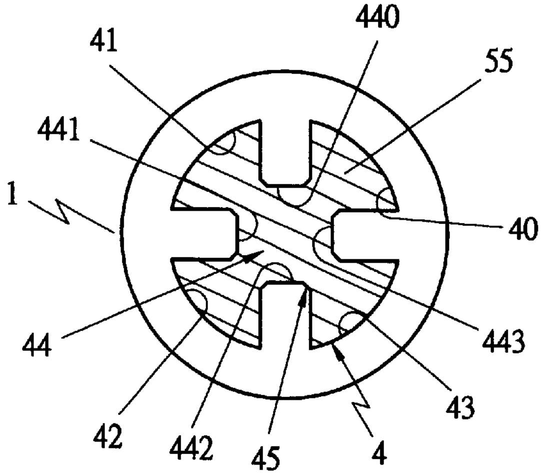
FIG. 17 is a cross-sectional view of the tailor-made drive bit engaged in the present invention (the compound drive recess)

A tailor-made drive bit 55 (U.S. patent Ser. No. 09/373,033) for the present invention shown in FIG. 16 can greatly enhance the capacity of withstanding high driving torques and the retention of the drive bit. FIG. 17 shows the tailor-made drive bit 55 fit in the present invention. Conventional screw drive force is applied in a circular direction that makes the pressure not evenly applied on the recess pressure-receive surface-the closer to the center the higher pressure. However, the drive bit tailor made for the present invention applies pressure perpendicularly and evenly on the surfaces of the four projecting bars (which is between each two neighboring fan-shaped portions), so it not only withstands high driving torques but also helps the drive bit to retain in the drive recess.

While the invention has been described above, it will be recognized and understood that various modifications may be made therein and the appended claims are intended to cover all such modifications which may fall within the spirit and scope of the invention.

What is claimed is:

1. A screw with compound recesses adapted to receive and be driven by a square type driver, cross-recess type driver and a flat-blade type driver, the screw comprising:

a head comprising a top surface and a lower portion;

a shank attached to the lower portion of the head;

a plurality of the compound recesses formed on the top surface of the head and extending toward the lower portion of the head, the compound drive recesses comprising a center square portion comprising a first pair of vertical walls parallel to one another, a second pair of vertical walls parallel to one another, and four corner gaps, the first and second pair of vertical walls perpendicular to one another, each adjacent ones of the vertical walls separated by one of the four corner gaps, and four fan-shaped portions, each one of the fan-shaped portions extending outwardly from a corresponding one of the four corner gaps, and each of the four fan-shaped portions having a proximal end with a first side at the center square portion and a distal end with a second side which is wider than the first side.

2. The screw with compound recesses as claimed in claim 1, wherein ends of the vertical walls are chamfered, such that eight chamfers are formed between the vertical walls and the fan-shaped portions.

* * * * *